Patented Dec. 12, 1939

2,183,226

UNITED STATES PATENT OFFICE 2,183,226

SIZING OF TEXTILE MATERIALS

Herbert Rein, Leipzig, Germany, assignor to I. G. Farbenindustrie Aktiengesellschaft, Frankfort-on-the-Main, Germany No Drawing. Application January 11, 1937, Serial No. 120,045. In Germany January 17, 1936

6 Claims. (Cl. 91—68)

The present invention relates to a process of preparing solutions of compounds of high molecular weight.

One of its objects is a process of preparing a solution of a water-insoluble compound of high molecular weight containing carboxyl. Another object are the solutions obtained according to this process. Another object is a process of impregnating textile material with the solutions above specified. A further object is the textile material impregnated with these solutions. Further objects will be seen from the detailed specification following hereafter.

This invention relates to a method of rendering soluble in water water-insoluble condensation products or polymerization products of high molecular weight containing carboxyl which are obtainable by reacting on the one side polycarboxylic acids as for instance, phthalic acid, succinic acid, adipic acid, tartaric acid with polyhydric alcohols as for instance glycerol, mannite, sorbite, pentaerythrite, ethylolamine. On the other hand unsaturated acids as for instance acrylic acid, methacrylic acid, crotonic acid may be polymerized together with vinyl derivatives such as for instance vinyl ethers and vinyl esters. There come into question for instance mixed polymerizates from vinyl ether and maleic anhydride, vinyl ester and acrylic acid. The invention consists in treating these products preferably at a raised temperature with a solution of urea or thiourea or a derivative of one of these. In this manner solutions may be obtained which are of high percentage strength and generally completely clear or only feebly turbid; such solutions may be used either alone or in admixture with another body for pressing, sticking, thickening, pasting, emulsifying or the like. A further advantage of these compounds resides in the fact that they dissolve well in organic solvents containing oxygen, particularly in glycol ethers, so that they may be used even in the absence of water. The coating obtained in this manner and dried is soluble in water and can be easily removed thereby.

The following examples serve to illustrate the invention:

1. 100 grams of a mixed polymerizate from vinyl butyl ether and maleic anhydride are heated on the water bath with 200 grams of urea in 1200 cc. of water, whereby a solution is gradually formed. Instead of water methyl glycol may be used, in which case a clear solution is also obtained which may be mixed to any extent with water.

2. 200 grams of glycerol phthalic acid resin are stirred while warming with 100 grams of urea in 1200 cc. of water. Complete dissolution soon occurs.

3. 100 grams of a condensation product from colophony and maleic acid anhydride are dissolved in 1200 cc. of water together with 200 grams of urea in the manner described in Example 2.

4. 100 grams of the mixed polymerizate from 2 parts of acrylic acid and 1 part of acrylic acid methyl ester are heated with 200 grams of thiourea in 1000 cc. of water whereby complete dissolution occurs.

5. 100 grams of the mixed polymerizate from vinylbutylether and maleic anhydride are heated with 200 grams of unsymmetrical dimethyl urea in 1000 cc. of water and thereby brought into solution.

6. 100 grams of the mixed polymerizate from polyvinyl butyl ether and maleic anhydride are heated with 200 grams of symmetrical dimethyl urea in 1000 cc. of water; a solution is produced.

7. 100 grams of a mixed polymerizate from vinylbutylether and maleic acid and 100 grams of urea are dissolved in 1000 cc. of methylgylcolether while heating the solution. Untwisted viscose silk is impregnated with this solution by means of a known impregnating apparatus during a spooling process. There is obtained a well smoothed thread which may easily be worked up to a fabric and this latter may easily be desized by simply washing it with hot water.

What I claim is:

1. A process which comprises treating a mixed polymerisate from vinylbutylether and maleic acid together with an excess of a concentrated solution of urea in methylglycol ether to form a solution and impregnating a textile material with this solution, the ratio of said polymerizate by weight to said concentrated solution by volume being about 1:about 6 to 12 and the ratio by weight of said polymerizate to said urea in said concentrated solution being about 1:about ½ to 2.

2. A textile material sized with a water-soluble size comprising the product of reaction of a mixed polymerisate from vinylbutylether and maleic acid with an excess of a concentrated solution of urea in methylglycolether, the ratio of said polymerizate by weight to said concentrated solution by volume being about 1:about 6 to 12 and the ratio by weight of said polymerizate to said urea in said concentrated solution being about 1:about ½ to 2.

3. In the process of sizing materials, the improvement which comprises impregnating said textile materials with an aqueous solution of a water-insoluble resin containing carboxylic acid groups made soluble in water by treatment with an excess of a concentrated solution of a compound selected from the group consisting of urea, thiourea and methylurea, the ratio of said resin by weight to said concentrated solution by volume being about 1:about 6 to 12 and the ratio by weight of said resin to said urea in said concentrated solution being about 1:about ½ to 2.

4. In the process of sizing textile materials, the improvement which comprises impregnating said textile materials with an aqueous solution of a water-insoluble condensation product from organic polycarboxylic acids and polyhydric alcohols made soluble in water by treatment with an excess of a concentrated solution of a compound selected from the group consisting of urea, thiourea and methylurea, the ratio of said resin by weight to said concentrated solution by volume being about 1:about 6 to 12 and the ratio by weight of said resin to said urea in said concentrated solution being about 1:about ½ to 2.

5. A textile material impregnated with an aqueous solution of a water-insoluble resin containing carboxylic acid groups, said resin being made soluble in water by the treatment with an excess of a concentrated solution of a compound selected from the group consisting of urea, thiourea and methylurea, the ratio of said resin by weight to said concentrated solution by volume being about 1:about 6 to 12 and the ratio by weight of said resin to said urea in said concentrated solution being about 1:about ½ to 2.

6. A textile material impregnated with an aqueous solution of a water-insoluble condensation product from an organic polycarboxylic acid and a polyhydric alcohol, said condensation product being made water-soluble by treatment with an excess of a concentrated solution of a compound selected from the group consisting of urea, thiourea and methylurea, the ratio of said resin by weight to said concentrated solution by volume being about 1:about 6 to 12 and the ratio by weight of said resin to said urea in said concentrated solution being about 1:about ½ to 2.

HERBERT REIN.